United States Patent
Cox

(10) Patent No.: US 6,939,056 B2
(45) Date of Patent: Sep. 6, 2005

(54) ANCHOR FOR FIBER OPTIC CABLE

(75) Inventor: Larry R. Cox, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/702,826

(22) Filed: Nov. 6, 2003

(65) Prior Publication Data
US 2005/0163433 A1 Jul. 28, 2005

(51) Int. Cl.⁷ .............................................. G02B 6/36
(52) U.S. Cl. ........................................ 385/86; 385/100
(58) Field of Search ............................ 385/86, 87, 88, 385/92, 100

(56) References Cited

U.S. PATENT DOCUMENTS

| | | | |
|---|---|---|---|
| 4,339,171 A | 7/1982 | Makuch et al. | |
| 4,447,120 A | 5/1984 | Borsuk | |
| 4,626,067 A | 12/1986 | Watson | |
| 4,795,229 A * | 1/1989 | Abendschein et al. | 385/87 |
| 4,815,810 A | 3/1989 | Betzler et al. | |
| 4,948,222 A * | 8/1990 | Corke et al. | 385/100 |
| 5,185,840 A | 2/1993 | Iapicco | |
| 5,199,095 A | 3/1993 | Iapicco | |
| 5,371,827 A * | 12/1994 | Szegda | 385/136 |
| 5,491,766 A | 2/1996 | Huynh et al. | |
| 5,514,055 A | 5/1996 | Elliott | |
| 5,559,917 A * | 9/1996 | Ott | 385/86 |
| 5,615,293 A | 3/1997 | Sayegh | |
| 5,745,633 A * | 4/1998 | Giebel et al. | 385/136 |
| 5,838,861 A | 11/1998 | Bunde | |
| 5,892,871 A | 4/1999 | Dahan et al. | |
| 5,895,079 A | 4/1999 | Carstensen et al. | |
| 5,903,693 A | 5/1999 | Brown | |
| 5,970,195 A | 10/1999 | Brown | |
| 6,049,647 A | 4/2000 | Register et al. | |
| 6,278,381 B1 * | 8/2001 | Bogert | 340/945 |
| 6,278,831 B1 | 8/2001 | Henderson et al. | |

(Continued)

FOREIGN PATENT DOCUMENTS

EP    0 131 283    1/1985

(Continued)

OTHER PUBLICATIONS

Fiber Optic ST* and FC Connectors, Termination Procedures for Single -Mode and Multimode Field Mountable Connectors, Instructions, 3M Company, Austin, TX, Apr. 1995, Issue 1, pp. 1-20.

(Continued)

Primary Examiner—Thanh-Tam Le
(74) Attorney, Agent, or Firm—Melanie G. Gover; James J. Trussell

(57) ABSTRACT

An anchored fiber optic cable assembly. The assembly comprises: a plurality of fiber optic cables and an anchor. Each of the cables comprises a strength member, and a jacket around the strength member. The cable includes a first end and a second end. The anchor includes a first end and a second end, and a plurality of passages extending through the anchor from the first end to the second end. Each of said cables is mounted in a respective one of the passages such that the strength member is bonded to the anchor. An anchored cable assembly mounted in a housing is also described, as are methods of anchoring the cables and methods of mounting the anchored cables in a housing. Each of the cables may include an optical fiber in the jacket.

27 Claims, 2 Drawing Sheets

U.S. PATENT DOCUMENTS

| | | |
|---|---|---|
| 6,356,690 B1 | 3/2002 | McAlpine et al. |
| 6,389,214 B1 | 5/2002 | Smith et al. |
| 6,400,873 B1 | 6/2002 | Gimblet et al. |
| 6,419,399 B1 | 7/2002 | Loder et al. |
| 6,421,495 B1 | 7/2002 | Hoffmeister et al. |
| 6,438,299 B1 * | 8/2002 | Brown et al. ............... 385/100 |
| 6,485,196 B2 * | 11/2002 | Shiino et al. ................ 385/87 |
| 6,496,625 B1 | 12/2002 | Falkowich et al. |
| 6,519,395 B1 | 2/2003 | Bevan et al. |
| 6,556,754 B2 | 4/2003 | Simmons et al. |
| 6,769,817 B2 * | 8/2004 | Saito et al. ................. 385/90 |
| 2002/0122653 A1 | 9/2002 | Donaldson et al. |
| 2003/0021575 A1 | 1/2003 | Werkheiser et al. |
| 2003/0063867 A1 | 4/2003 | McDonald et al. |
| 2003/0063868 A1 | 4/2003 | Fentress |
| 2003/0063869 A1 | 4/2003 | Elkins et al. |

FOREIGN PATENT DOCUMENTS

| | | |
|---|---|---|
| EP | 0 256 710 | 2/1988 |
| EP | 0 512 811 A1 | 11/1992 |
| EP | 0 563 995 A1 | 10/1993 |
| EP | 0 779 527 A2 | 6/1997 |
| EP | 1 245 980 A2 | 10/2002 |
| FR | 2 512 218 | 3/1983 |
| GB | 2 032 130 A | 4/1980 |
| GB | 2 110 834 A | 6/1983 |
| WO | WO 03/087913 A1 | 10/2003 |

OTHER PUBLICATIONS

3M Brand Biconic Connectors, Instruction Manual, Termination Procedures for Single-Mode and Multimode Field Mountable Connectors, 3M Fiber Optic Products, 1989.

Search Report for PCT/US2004/035429.

U.S. Application entitled "Anchor for Fiber Optic Cable", filed Nov. 6, 2003, having U.S. Appl. No. 10/702,345.

U.S. Application entitled "Anchor for Fiber Optic Cable", filed Nov. 6, 2003, having U.S. Appl. No. 10/702,330.

* cited by examiner

US 6,939,056 B2

ANCHOR FOR FIBER OPTIC CABLE

FIELD OF INVENTION

The present invention relates to an anchor for a fiber optic cable and a method of assembly. In particular, the present invention pertains to an anchor for a plurality of fiber optic cables that structurally engages a strength member in the cables and is conveniently mounted in a desired housing.

BACKGROUND

It is a common practice to attach fiber optic cables to various housings, connectors, or other optical devices. It is also known to structurally engage the strength member of the optical fiber to the fiber optic assemblies to provide a so-called "ruggedized" assembly. While methods and devices described in the art may be useful in various applications, there is a continuing need to develop other devices and methods that can easily be applied and mounted.

SUMMARY

Disclosed herein are an anchor for use with a plurality of optical cables, an assembly of anchored cables, and an anchored cable and housing assembly, along with methods of anchoring the cables and mounting the anchored cables in a housing. The anchor is bonded to and structurally engaged with a strength member in the optical cables. The cables may be conveniently mounted to the anchor prior to mounting the anchor in the housing.

In one aspect, the present invention relates to an anchored fiber optic cable assembly. The assembly comprises: a plurality of fiber optic cables, each of the cables comprising a strength member and a jacket around the strength member, wherein the cable includes a first end and a second end; and an anchor, the anchor including a first end and a second end, and a plurality of passages extending through the anchor from the first end to the second end; wherein each of the cables is mounted in a respective one of the passages such that the strength member is bonded to the anchor. Each of the fiber optic cables may include an optical fiber.

In another aspect, the present invention relates to an anchored fiber optic cable assembly. The assembly comprises: a plurality of fiber optic cables, each of the cables comprising an optical fiber, a strength member comprising a plurality of aramid filaments, and a jacket around the optical fiber and the strength member, wherein the cable includes a first end and a second end, and wherein the strength member extends from within the jacket at the first end of the cable, over the jacket towards the second end of the cable; and an anchor, the anchor including a first end and a second end, and a plurality of passages extending through the anchor from the first end to the second end; wherein each of the cables is mounted in a respective one of the passages such that the strength member is bonded to the anchor, and wherein each of the optical fibers extends through the passage beyond the first end of the anchor.

In yet another aspect, the present invention relates to a method of anchoring a plurality of fiber optic cables in an anchor, wherein each of the cables comprises a strength member and a jacket around the strength member, and wherein the anchor comprises a plurality of passages extending from a first end to a second end of the anchor. The method comprises the steps of: exposing a portion of the strength member; folding the exposed portion of the strength member over the jacket in the direction of the second end of the cable; inserting the first end of the cable into the passage; and bonding the strength member to the anchor in the passage. The fiber optic cables may each include an optical fiber.

As used herein, a "fiber optic cable" comprises at least one optically transmissive core, typically a glass core, each core surrounded by cladding. A buffer coating typically surrounds the core/cladding combination. A buffer tube typically surrounds the core/cladding, and can be either a tight or loose buffer tube as determined by its fit over the core. A protective jacket surrounds the buffer tube. A strength member is included within the jacket alongside the buffer tube. A fiber optic cable may contain more than one glass core and cladding. Information and data, packaged in the form of light waves, travels the length of the glass core. Thus, the glass core serves as the communication channel. The term "optical fiber" refers to the combination of the glass core, cladding, and buffer coating. As explained in more detail below, it may be desirable to remove the optical fiber from the fiber optic cable while mounting the anchor and cable. For convenience, the term "fiber optic cable" will be used herein to refer to the jacket and strength member, with or without an optical fiber present in the fiber optic cable.

The above summary of the present invention is not intended to describe each disclosed embodiment or every implementation of the present invention. The Figures and the detailed description, which follow more particularly exemplify illustrative embodiments.

BRIEF DESCRIPTION OF THE DRAWINGS

The present invention can be described with reference to the following figures, wherein.

These figures are idealized, not drawn to scale and are intended for illustrative purposes.

DETAILED DESCRIPTION

Figure 1:
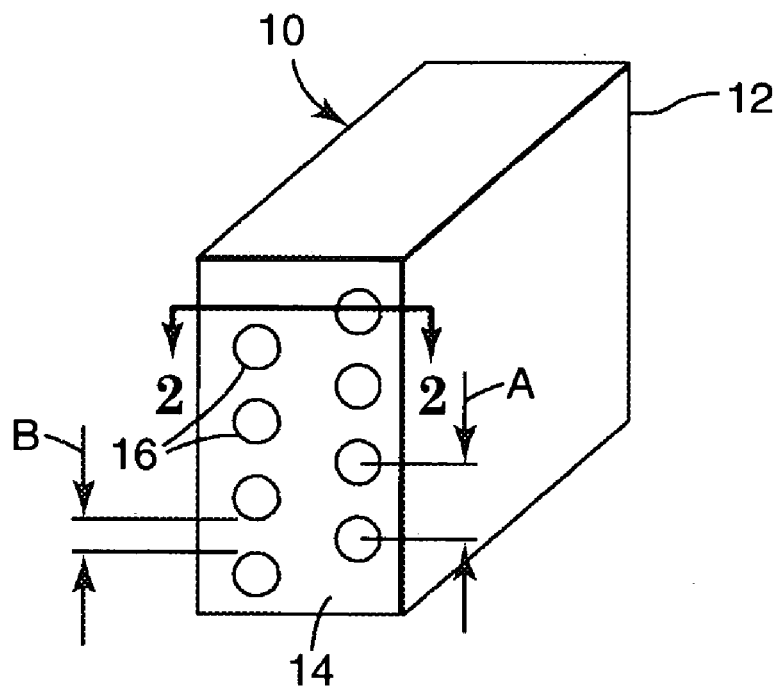
FIG. 1 is an isometric view of an exemplary anchor.

FIG. 1 shows an exemplary anchor for use with the present invention. The anchor 10 may be mounted on a plurality fiber optic cables. The anchor 10 includes a first end 12 and a second end 14 opposite the first end. Anchor 10 also includes a plurality of passages 16 extending through the anchor from second end 14 to first end 12. As explained in detail below, the passages 16 are sized and configured to each accept an optical fiber.

Figure 2:
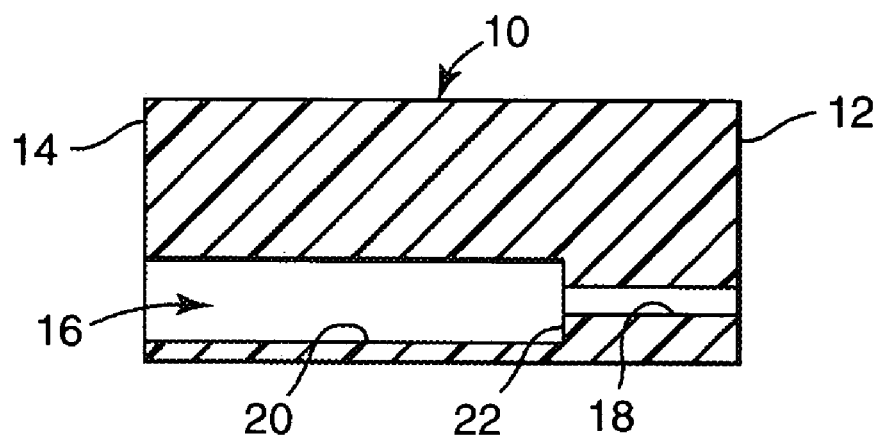
FIG. 2 is a cross sectional view taken along line 2—2 of the anchor of FIG. 1.

FIG. 2 is a cross sectional view taken along line 2—2 of the anchor of FIG. 1, showing one of the passages 16 in greater detail. Passage 16 includes a cable passage 20 open to the second end of the anchor 10 and extending partially through the anchor towards the first end 12. Passage 16 also includes an optical fiber passage 18 open to the first end 12 of the anchor 10, and extending partially through the anchor towards the second end 14. The cable passage 20 has a larger diameter than the optical fiber passage 18. This results in a shoulder 22 where the cable passage 20 and the optical fiber passage 18 meet. This is to allow the fiber optic cable to extend from the second end 14 of the anchor into the cable passage 20 as far as the shoulder 22, and allow the optical fiber to continue through the optical fiber passage 18 and exit the first end of the anchor 10.

The anchor 10 may be conveniently machined or formed from any suitable metal or alloy, such as brass, stainless steel, copper, and aluminum. Other suitable materials include high strength molded plastic, such as Ultem™, Valox™, and Lexan™, all available from GE Plastics, and ABS.

Figure 3:
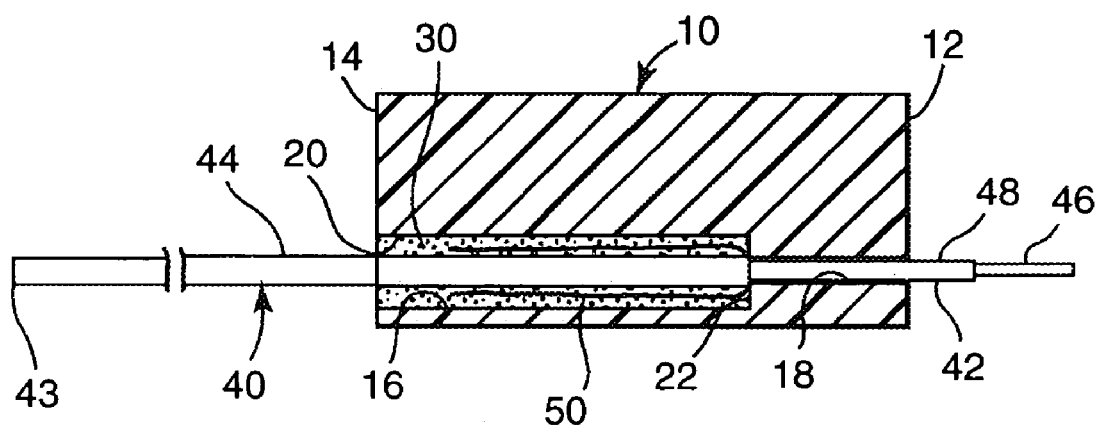
FIG. 3 is a view like FIG. 2 showing an exemplary fiber optic cable mounted in the anchor.

FIG. 3 is a view like FIG. 2, illustrating an exemplary fiber optic cable 40 mounted in the anchor 10. The exemplary fiber optic cable 40 of FIG. 3 includes a first end 42 mounted in the anchor 10 and a second end 43 opposite the first end. Cable 40 also includes a protective jacket 44. Within the jacket 44 is optical fiber 46. The optical fiber 46 comprises an optically transmissive core, typically a glass core, surrounded by cladding (not illustrated). A buffer coating (not illustrated) typically surrounds the core/cladding combination. Optional buffer tube 48 surrounds the core, cladding and buffer of the optical fiber 46, and can be either a tight or loose buffer tube as determined by its fit. A strength member 50 is included within the jacket 44 alongside the buffer tube 48. A fiber optic cable 40 may contain more than one glass core and cladding. Information and data, packaged in the form of light waves, travels the length of the glass core. Thus, the glass core serves as the communication channel. Strength member 50 is selected to provide a high strength, low stretch component. In an exemplary embodiment, the strength member comprises a plurality of filaments. In one aspect the strength member comprises aramid fibers, such as Kevlar™ aramid fibers. The construction, manufacture and use of fiber optic cables is well known in the art, and need not be described in greater detail herein.

The fiber optical cable is structurally engaged with the anchor 10 as follows. Strength member 50 extends beyond the end of the jacket 40 at the first end 42 of the cable. The strength member is folded back along the outside of the jacket 44 towards the direction of the second end 43 of the cable. Adhesive 30 in the passage 16 structurally engages and bonds the strength member 50 to the anchor 10. The adhesive may be chosen depending on the material of the strength member, the jacket, the inner sleeve and the outer sleeve. Exemplary adhesives include cyanoacrylates, such as 3M™ Pronto™ Instant Adhesives CA8 and CA100 from 3M Company, St. Paul, Minn.; Loctite™ 380 and 480 Instant Adhesives, from Henkel Loctite Corporation, and epoxies. Any desired number of passages 16 and corresponding cables 40 may be provided. Each of the cables may be mounted in a respective passage as just described. The length and diameter of the passage 16, including the cable passage 20 and the optical fiber passage 18, are chosen with respect to the size of the cable to be used, the size of the optical fiber to be used, the nature and size of the strength member 50, and whether or not a buffer tube is present and is desired to extend into the optical fiber passage. In an exemplary embodiment, the size of the cable passages is up to 15% larger than the diameter of the fiber optic cable. In another exemplary embodiment, the size of the cable passages is up to 20% larger than the diameter of the fiber optic cable. In yet another exemplary embodiment, the size of the cable passages is at least 15% larger than the diameter of the fiber optic cable.

An exemplary method of mounting the cable 40 in the anchor 10 and bonding the cable to the anchor is as follows. The strength member 50 is exposed at the first end of the cable such as by cutting the jacket 44 a desired distance back from the first end 42 of the cable. The strength member 50 is then folded back along the outside of the jacket 44 in the direction of the second end 43 of the cable. In those embodiments in which the strength member comprises a plurality of filaments, the filaments may be distributed generally uniformly around the outside of the jacket 44. Adhesive 30 is applied to the strength member 50 and the outside of the jacket 44 from at or near the first end of the jacket for a length approximately the same as the depth of the cable passage 16. The cable is then inserted into the cable passage 16 until the strength member 50 and the end of the jacket stop at the shoulder 22. The optical fiber 46 continues through the optical fiber passage 18 and exits the anchor 10 at the first end 12. Alternatively, the adhesive may be inserted in the cable passage 20 prior to inserting the cable 40 into the passage. In such an option, care must be taken to avoid contaminating the optical fiber 46 with the adhesive. The method of mounting the cable in the anchor is carried out for each of the respective cables to be mounted in a respective passage of the cable.

The assembly just described may be accomplished with the optical fiber 46 pulled back from the first end 42 of the optical fiber 40 or totally removed from the optical fiber 40. This allows placing the empty buffer tube 48 through the passage 16, and trimming the buffer tube to the desired length with respect to the first end 12 of the anchor. The buffer tube may be flush with the first end of the anchor, may extend a desired length beyond the first end 12 (as illustrated in FIG. 3), or may extend only part way through the passage 16 from the second end 14 towards the first end 12 of the anchor. After trimming the buffer tube 48 to the desired length, the optical fiber 46 may then be threaded through the buffer tube until the optical fiber extends the desired amount beyond the first end 12 of the anchor 10.

It is desirable to have a secure structural engagement between the anchor 10 and the bonded strength member 50. This allows the strength member to carry tensile loads applied to the anchor while protecting the optical fiber 46 from being damaged by tension. In an exemplary embodiment, the optical fiber 46 may move transversely within the jacket and anchor without significantly adversely affecting the signal transmitting capability of the optical fiber.

If tension is applied to the cable 40 or to the anchor 10 in a way that would tend to pull the cable from the second end 14 of the anchor, the strength member will carry the tension and help prevent the tension from adversely affecting the optical fiber 46. If a force is applied through the cable that would tend to push the cable in the direction of the first end 12 of the anchor, the adhesive 30 and the shoulder 22 will prevent cable from moving significantly in that direction. That will help prevent harmful bending of the optical fiber 46, and help avoid violating the minimum bend radius for the optical fiber.

The anchor of the present invention allows the cables to be mounted to the anchor with the strength members structurally engaged with the anchor, prior to being connected to a desired optical device. The desired number of cables may be conveniently mounted in the anchor without use of tools, and in particular without the need to crimp. The anchored cables may then be easily mounted to a desired optical device, without having to crimp the anchor. This allows the cables to be anchored without having to provide room to apply a crimping tool. This also allows for an anchor that may have a plurality of cables mounted therein, in close proximity to one another. In an exemplary embodiment, the center-to-center distance A between adjacent cable passages 20, at the second end 14 of the anchor, is no more than 2 times the diameter of the cable passage 20. In another exemplary embodiment, the center-to-center distance A between adjacent cable passages 20, at the second end 14, is no more than 1.5 times the diameter of the cable passage 20. In yet another exemplary embodiment, the minimum distance B between adjacent cable passages 20, at the second end 14, is no more than 0.5 mm. In yet another exemplary embodiment, the minimum distance B between adjacent cable passages 20, at the second end 14, is no more than 0.2 mm.

Figure 4:
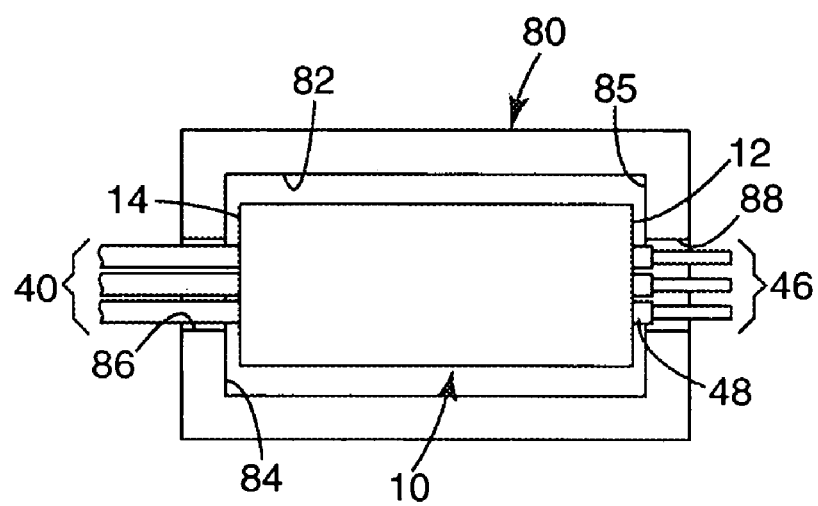
FIG. 4 is a top view of an exemplary anchored mounted in an exemplary housing.

An anchored cable according to the present invention is well suited for convenient mounting in a housing 80 as illustrated in FIG. 4. The housing may be a portion of any desired device useful with fiber optic cables. For example, the housing 80 may be a portion of a fan-out, a shuffle, or an optical connector. An exemplary fan-out assembly is described in published PCT application WO03/087913. An exemplary fan-out assembly is commercially available as MTP™ MPO Multi-Fiber Fan-Out Cable Assembly, from 3M Company, Austin, Tex. An exemplary shuffle is described in U.S. Pat. No. 6,556,754. An exemplary optical connector is commercially available as an MTP™ Connector from US Connect, Hickory, N.C.

Exemplary housing 80 of FIG. 4 includes an anchor cavity 82. The anchor cavity 82 is sized and configured to engage with the anchor 10 of the present invention. The housing includes an inlet slot 86 that allows a plurality fiber optic cables 40 to enter the housing 80 when the anchor 10 is mounted in the anchor cavity. The housing 80 also includes an outlet slot 88 that allows a plurality of optical fibers 46 to exit the anchor cavity 82 for connection as desired with an optical device. The anchor cavity 82 includes a first shoulder 84 that is configured to engage with the anchor in such as way as to prevent the anchor from exiting the cavity 82 through the inlet slot 86. The anchor cavity also includes a second shoulder 85 configured to engage with the anchor in such a way as to prevent the anchor from exiting the cavity through the outlet slot 88. In an exemplary embodiment, the first shoulder 84 forms the inlet slot 86 to be smaller than the second end 14 of the anchor, and the second shoulder 85 forms the outlet slot 88 to be smaller than the first end 12 of the anchor 10. The housing 80 may be a two-piece housing such that the two pieces may be secured together, such as with bolts, after the anchor is placed within the anchor cavity 82. The housing 80 may have a plurality of anchor cavities 82 to accommodate a plurality of anchors, each of the anchors mounted with a plurality of respective cables 40.

When the anchored cable assembly is mounted in the housing 80 as shown in FIG. 4, some of the advantages of the present invention are apparent. If tension is applied to any number of the cables 40 or to the housing in a way that would tend to pull the cables through the inlet slot 86 of the housing, the anchor will contact the first shoulder 84 to prevent the cable from exiting the housing. Because the strength members 50 of the cables are bonded to and structurally engaged with the anchor, the strength members will carry the tension and help prevent the tension from adversely affecting the optical fibers 46. If a force is applied through any number of the cables 40 that would tend to push the anchor 10 through the outlet slot 88, the second shoulder 85 will prevent the anchor from moving significantly in that direction. That will help prevent harmful bending of the optical fibers 46, and help avoid violating the minimum bend radius for the optical fibers.

The anchor of the present invention allows the cables to be mounted with the anchor and be structurally engaged by the strength members prior to being installed in the housing.

The cables may be conveniently mounted with the anchor without use of tools, and in particular without the need to crimp. The anchored cables may then be easily mounted in the housing, without having to crimp the anchor onto the housing. This allows the anchor to be mounted with the housing without having to provide room at the housing to apply a crimping tool. This also allows for a housing that may have a plurality of cables mounted therein, in close proximity to one another.

The second ends 43 of the cables may have mounted thereon an anchor according to the present invention. Such anchor may be mounted in a housing of an optical device as just described with respect to the first end of the cable. In such a case, the same advantages with regard to minimizing tension in the optical fibers 46 and bending of the optical fiber 46 may be attained as described with regard to the first end of the cables 40. The second end of the cable may have mounted thereon any desired optical connector, or may be connected with any desired optical device. At either end of the cable, the cable may be terminated by any suitable means such as mechanical splicing or fusion splicing, and can be connected to any suitable terminating device or connector.

What is claimed is:

1. An anchored fiber optic cable assembly, comprising:
   a plurality of fiber optic cables, each of said cables comprising a strength member and a jacket around said strength member, wherein each of said cables includes a first end and a second end; and
   an anchor, said anchor including a first end and a second end, and a plurality of passages extending through said anchor from said first end to said second end;
   wherein each of said passages comprises a cable passage open to said second end and a fiber optic passage open to said first end, and a shoulder between said cable passage and said optic passage; and
   wherein each of said cables is mounted in a respective one of said passages such that said strength member is bonded to said anchor within said passage by an adhesive.

2. The anchored fiber optic cable assembly of claim 1, wherein each of said fiber optic cables includes an optical fiber in said respective jacket.

3. The anchored fiber optic cable assembly of claim 2, wherein said strength member comprises a plurality of filaments.

4. The anchored fiber optic cable assembly of claim 3, wherein said filaments comprise aramid filaments.

5. The anchored fiber optic cable assembly of claim 2, wherein said strength member extends from within said jacket at said first end of said cable, over said jacket towards said second end of said cable.

6. The anchored fiber optic cable assembly of claim 5, wherein said strength member is bonded to said anchor by an adhesive in each of said respective passages.

7. The anchored fiber optic cable assembly of claim 2, wherein each of said optical fibers extends through said passage beyond said first end of said anchor.

8. The anchored fiber optic cable assembly of claim 2, wherein said assembly is optically connected with a fiber optic fan-out assembly.

9. The anchored fiber optic cable assembly of claim 2, wherein said assembly is optically connected with a fiber optic shuffle.

10. The anchored fiber optic cable assembly of claim 2, wherein said optical fibers may move transversely within said jackets without significantly adversely affecting the signal transmitting capability of said optical fibers.

11. The anchored fiber optic cable assembly of claim 2, wherein at said second end of said anchor, the center-to-center distance between adjacent of said passages is no more than two times the diameter of said passage.

12. The anchored fiber optic cable assembly of claim 11, wherein at said second end of said anchor, the center-to-center distance between adjacent of said passages is no more than 1.5 times the diameter of said passage.

13. The anchored fiber optic assembly of claim 2, wherein at said second end of said anchor, the minimum distance between adjacent of said passages is no more than 0.5 mm.

14. The anchored fiber optic assembly of claim 13, wherein at said first end of said anchor, the minimum distance between adjacent of said passages is no more than 0.2 mm.

15. An anchored fiber optic cable assembly, comprising;
a plurality of fiber optic cables, each of said cables comprising an optical fiber, a strength member comprising a plurality of aramid filaments, and a jacket around said optical fiber and said strength member, wherein said cable includes a first end and a second end, and wherein said strength member extends from within said jacket at said first end of said cable, over said, jacket towards said second end of said cable; and
an anchor, said anchor including a first end and a second end, and a plurality of passages extending through said anchor from said first end to said second end;
wherein each of said passages comprises a cable passage open to said second end and a fiber optic passage open to said first end, and a shoulder between said cable passage and said optic passage; and
wherein each of said cables is mounted in a respective one of said passages such that said strength member is bonded to said anchor within said passage by an adhesive, and wherein each of said optical fibers extends through said passage beyond said first end of said anchor.

16. The anchored fiber optic cable assembly of claim 15, wherein said assembly is optically connected with a fiber optic fan-out assembly.

17. The anchored fiber optic cable assembly of claim 15, wherein said assembly is optically connected with a fiber optic shuffle.

18. The anchored fiber optic cable assembly of claim 15, wherein said optical fibers may move transversely within said jackets without significantly adversely affecting the signal transmitting capability of said optical fibers.

19. The anchored fiber optic cable assembly of claim 15, wherein at said second end of said anchor, the center-to-center distance between adjacent of said passages is no more than two times the diameter of said passage.

20. The anchored fiber optic cable assembly of claim 19, wherein at said second end of said anchor, the center-to-center distance between adjacent of said passages is no more than 1.5 times the diameter of said passage.

21. The anchored fiber optic assembly of claim 14, wherein at said second end of said anchor, the minimum distance between adjacent of said passages is no more than 0.5 mm.

22. The anchored fiber optic assembly of claim 21, wherein at said second end of said anchor, the minimum distance between adjacent of said passages is no more than 0.2 mm.

23. A method of anchoring a plurality of fiber optic cables in an anchor, wherein each of said cable comprises a strength member and a jacket around the strength member, and wherein said anchor comprises a plurality of passages extending from a first end to a second end of said anchor, said method comprising the steps of:
exposing a portion of the strength member;
folding the exposed portion of the strength member over the jacket in the direction of the second end of the cable;
inserting the first end of the cable into the passage; and
bonding the strength member to the anchor in the passage with an adhesive.

24. The method of claim 23, wherein each of said fiber optic cables includes an optical fiber in a respective jacket.

25. The method of claim 23, the method comprising the further step of placing an adhesive on said cable.

26. The method of claim 25, wherein the step of placing an adhesive is performed prior to the step of inserting the first end of the cable into the passage.

27. The method of claim 24, wherein the optical fiber extends from the second end of the anchor.

* * * * *

UNITED STATES PATENT AND TRADEMARK OFFICE
CERTIFICATE OF CORRECTION

PATENT NO. : 6,939,056 B2
DATED : September 6, 2005
INVENTOR(S) : Cox, Larry R.

It is certified that error appears in the above-identified patent and that said Letters Patent is hereby corrected as shown below:

<u>Title page,</u>
Item [56], References Cited, OTHER PUBLICATIONS, "3M Brand Biconic Connectors" reference, delete "Temrination" and insert -- Termination --.

<u>Column 7,</u>
Line 24, after "said" delete ",".

<u>Column 8,</u>
Line 12, delete "claim 14" and insert -- claim 15 --.

Signed and Sealed this

Twenty-first Day of March, 2006

JON W. DUDAS
*Director of the United States Patent and Trademark Office*